UNITED STATES PATENT OFFICE.

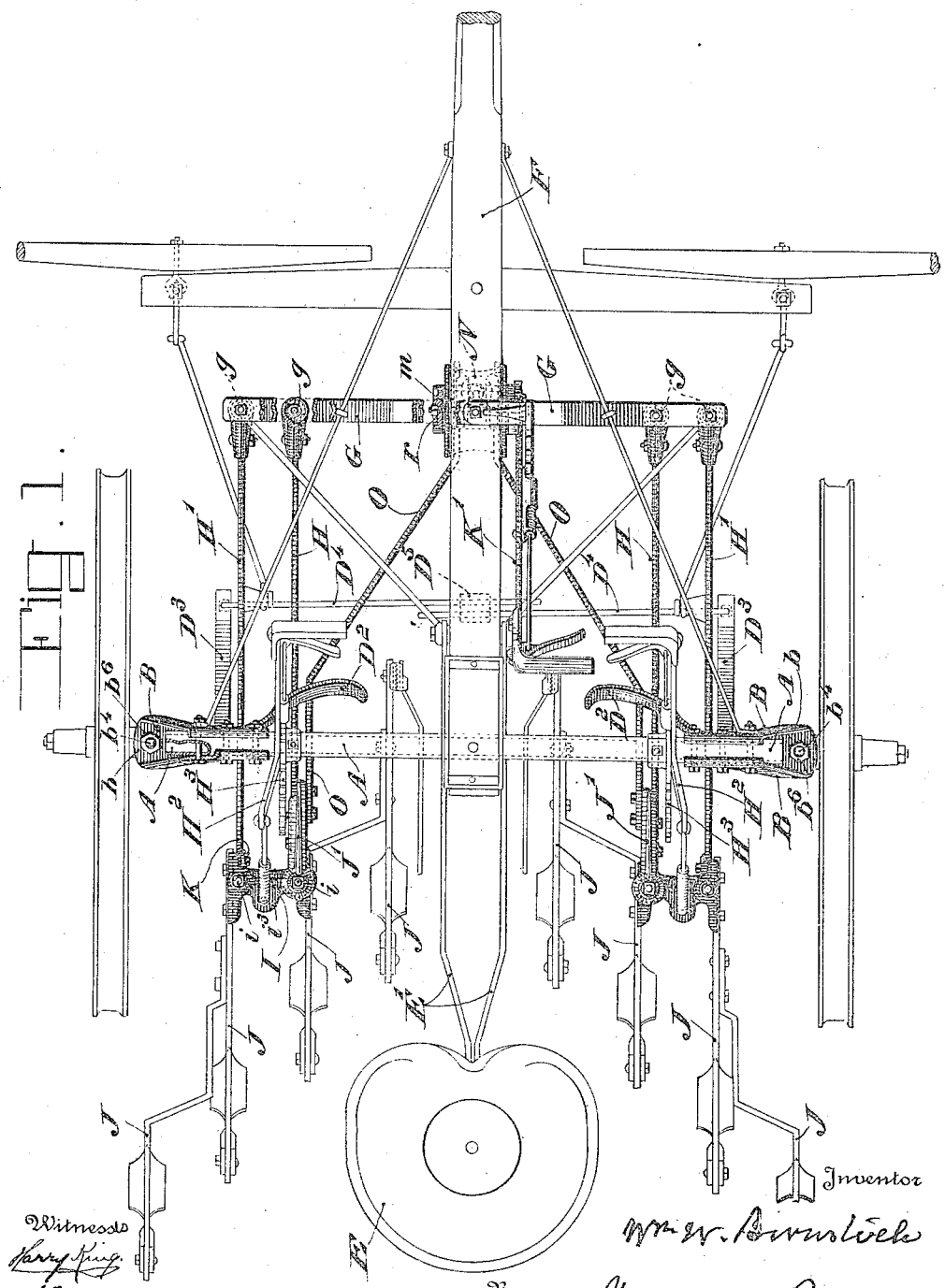

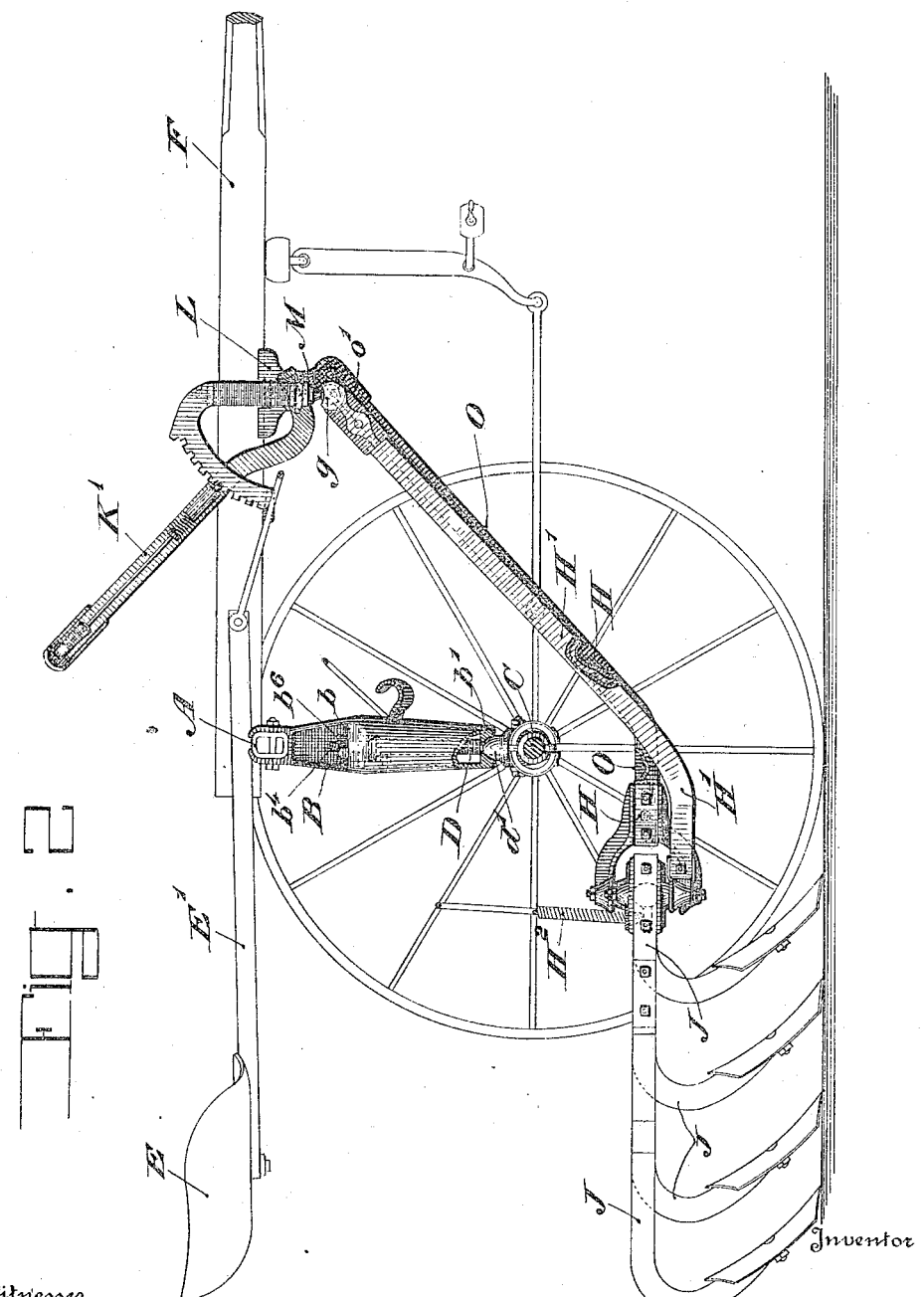

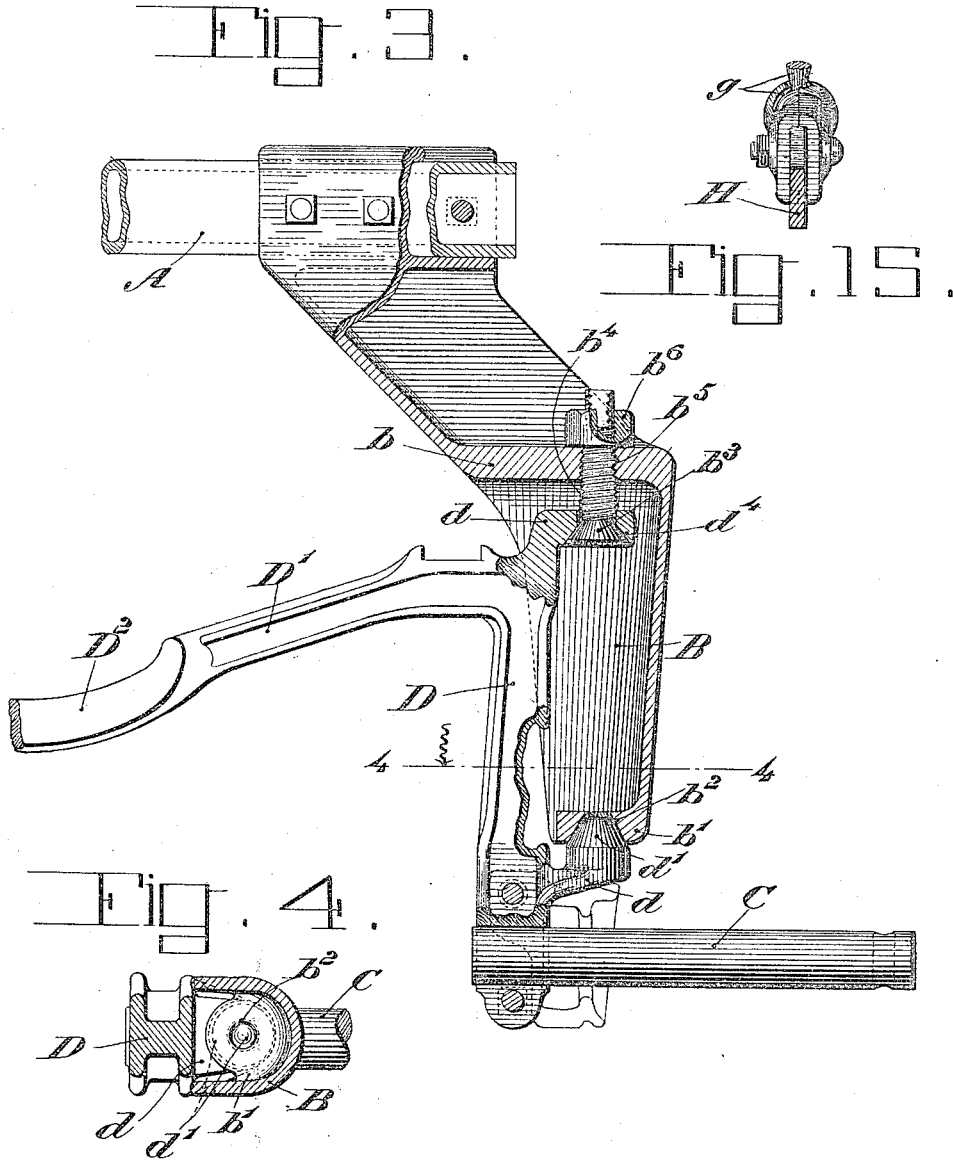

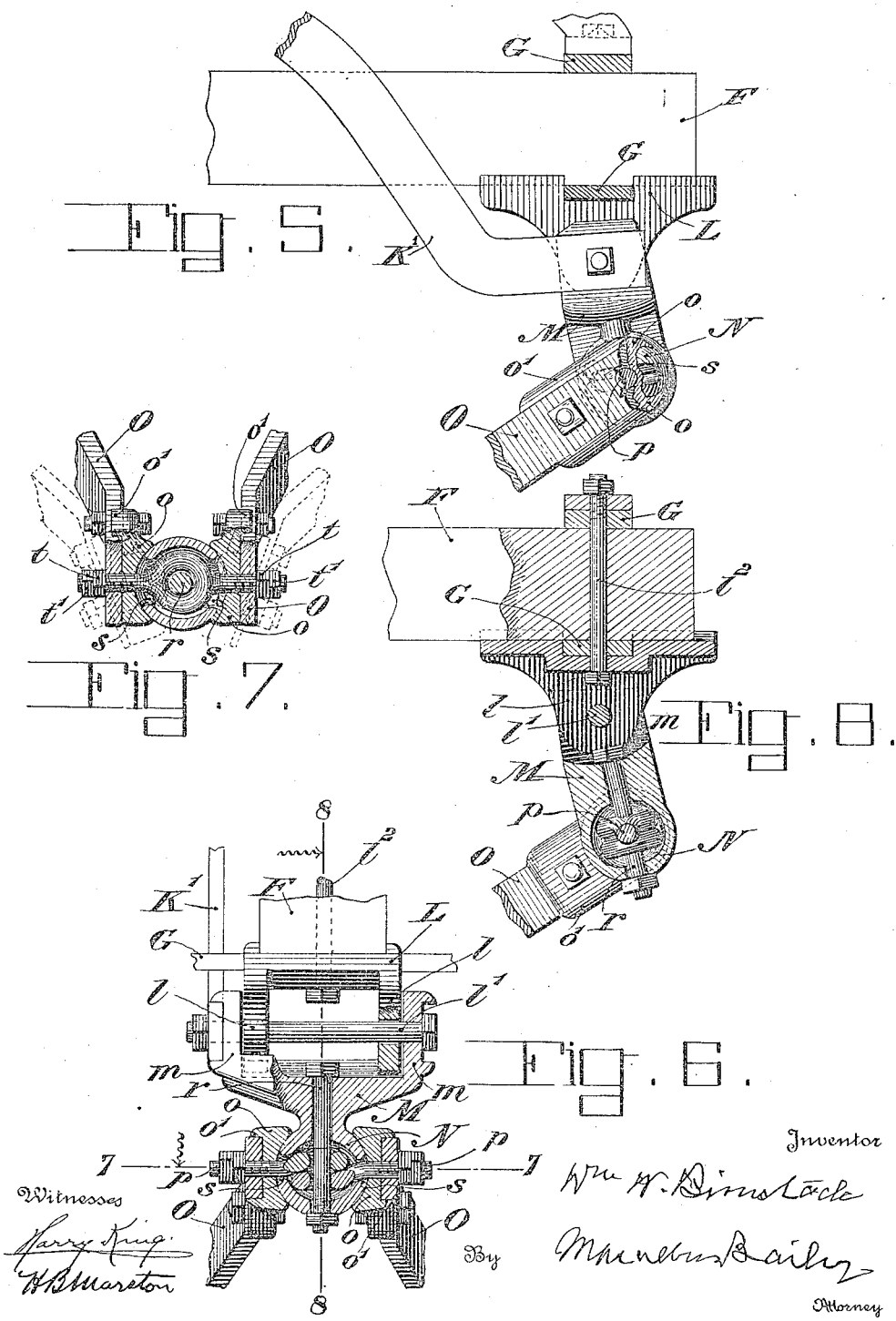

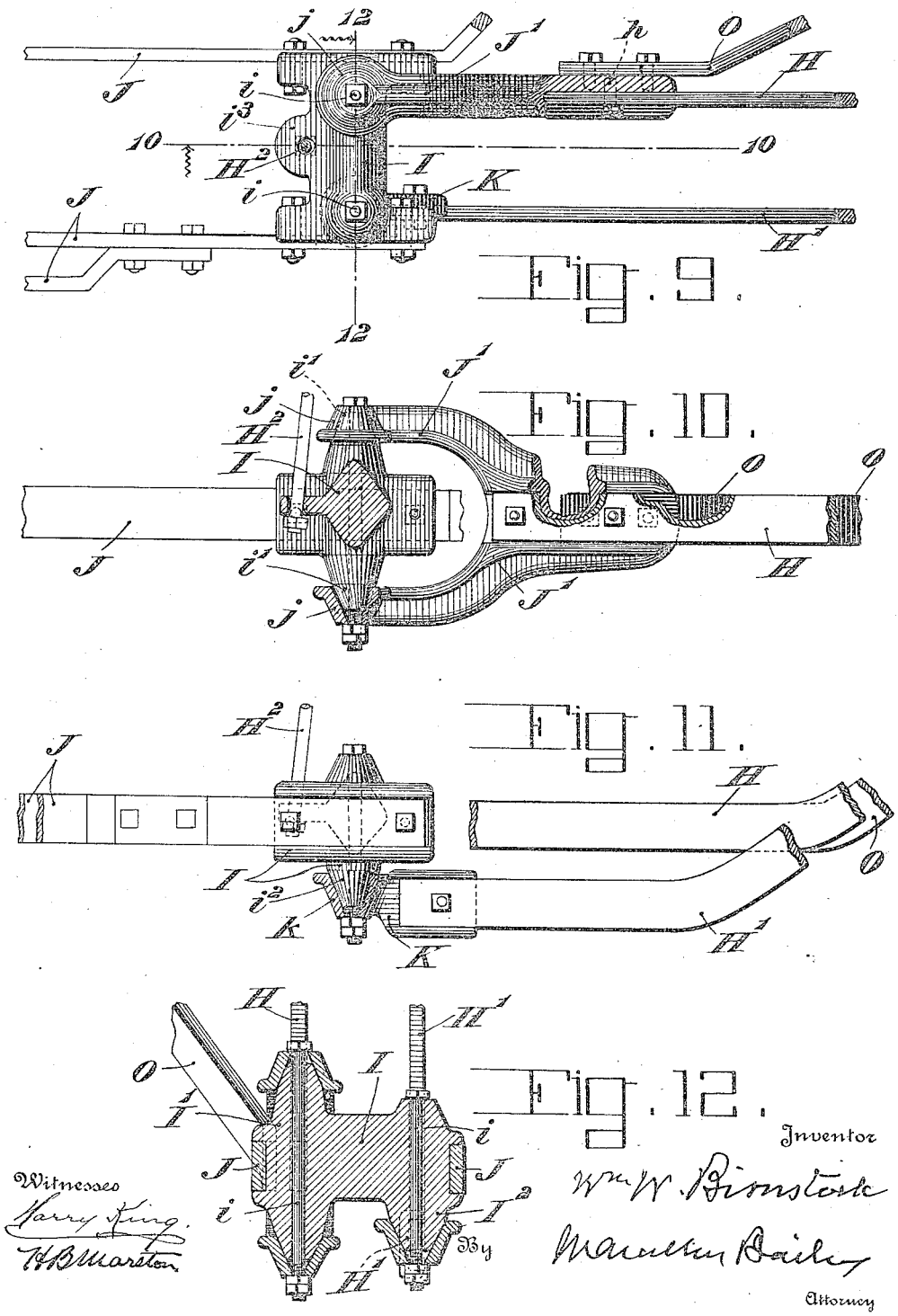

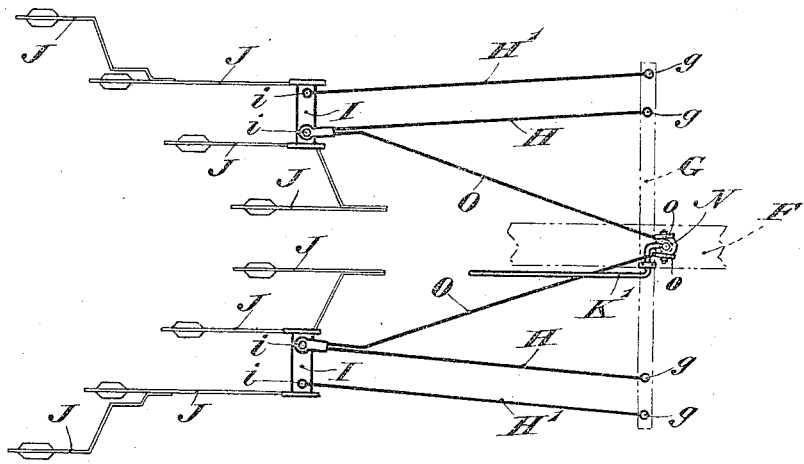
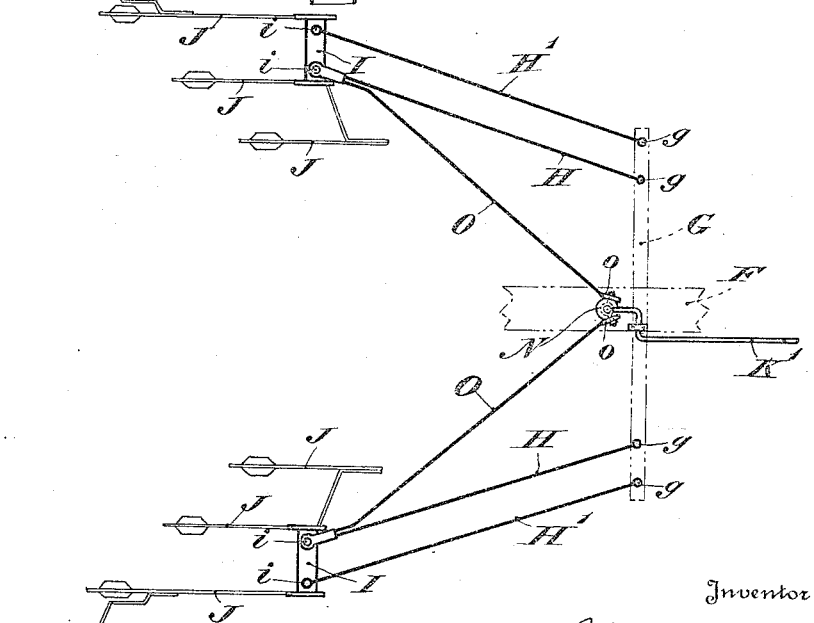

WILLIAM W. BIRNSTOCK, OF YORK, PENNSYLVANIA, ASSIGNOR TO HENCH & DROMGOLD COMPANY, OF YORK, PENNSYLVANIA.

CULTIVATOR.

1,226,450.  Specification of Letters Patent.  Patented May 15, 1917.

Application filed January 2, 1917. Serial No. 140,142.

*To all whom it may concern:*

Be it known that I, WILLIAM W. BIRNSTOCK, a resident of the city of York, in the county of York and State of Pennsylvania, have invented certain new and useful Improvements in Cultivators, of which the following is a specification.

My invention has principally to do with that type of cultivators known as pivot-axle cultivators, and it is in that connection that I shall describe it, although some of the features of my invention, relating more particularly to the drag-bars and their operating and adjusting mechanism, are applicable to cultivators of other types.

One part of my invention has to do with means for efficiently and surely taking up all lost motion in the bearings between the wheel standard—i. e., the standard which depends from and is secured to the arch beam—and the pivot axle standard—i. e., the standard that carries the stub axle for the wheel—which is pivotally mounted in and connected to the wheel standard.

Under this portion of my invention the lower pivot is on the pivot axle standard and it enters from below a socket formed for its reception in the lower portion of the wheel standard. But the upper pivot is carried, not by the pivot axle standard, but by the wheel standard; it projects up from below into a socket formed for its reception in the top of the pivot axle standard, and it is secured to the wheel standard at a point above the pivot axle standard, by connections whereby it is capable of vertical movement independently of the wheel standard in which it is supported for the purpose of tightening either or both of the pivot joints and of taking up all lost motion as occasion may require.

Another part of my invention relates to the drag-bars, of which there are a pair for each of the two gangs of shovels with which the machine is provided—the object being to obtain an easy parallel movement of the gangs in bringing them closer together or farther apart as desired, and preventing at the same time any lateral cocking or tilting of the gangs which will put them out of plumb and thus result in uneven and unsatisfactory work. Under my invention the two drag-bars of each pair form the two longer opposite sides of a parallelogram, the other two opposite sides of which are formed by the parts that connect the drag bars at front and rear—these parts being a cross beam to which the front ends of the drag-bars are jointed, by ball and socket or universal joints, and a cross head to which the rear ends of the drag-bars are pivoted each on a vertical axis. The shovel beams are secured to and carried by the cross head. Inasmuch as the cross head must of necessity be always parallel with its opposite side—the cross beam—no matter to what extent the drag-bars be laterally inclined, it follows that the shovel beams secured to that cross head are not correspondingly inclined with the drag-bars, but preserve the same position relatively to the line of draft that they had when originally fitted to the cross head. In connection with the parts thus combined and arranged, I provide a single lever and connections, one set of connections for each gang, whereby the two gangs can be swung, simultaneously and together, inwardly toward one another, or outwardly away from one another, as desired, and held in their thus-adjusted position.

Having indicated in a general way the nature of my improvements, I shall proceed to describe more in detail the manner in which said improvements are or may be carried into practical effect by reference to the accompanying drawings in which—

Figure 1 is a plan view of a straddle-row, pivot-axle cultivator embodying my improvements in their preferred form.

Fig. 2 is a side elevation of the same.

In these figures the portions of the machine in which my improvements are contained are in heavier lines than the other portions of the machine.

The remaining figures are on larger scale and are intended to illustrate the structural details of the parts in which my invention is embodied.

Fig. 3 is a vertical section, partly in elevation, of one of the wheel standards, its appropriate pivot axle standard, and their connections.

Fig. 4 is a cross section on line 4—4 Fig. 3.

Fig. 5 is a side elevation of the bracket and its attached parts, comprising the mechanism for swinging the drag-bars and their shovel gangs laterally toward and away from one another—the cap or half-socket on one side of the ball upon which said cap fits being broken away to expose more clearly the construction.

Fig. 6 is a front elevation of the same, with the parts of the ball and socket joint in axial section.

Fig. 7 is a section on line 7—7 Fig. 6.

Fig. 8 is a section on line 8—8 Fig. 6.

Fig. 9 is a plan view of the cross head to which the drag-bars of each pair are pivoted, and to which the shovel beams pertaining to that pair are rigidly fastened.

Fig. 10 is a section on line 10—10 Fig. 9, with portions of the structure broken away in order to disclose more clearly certain details of construction.

Fig. 11 is a side elevation of the cross head and its attached parts from that side on which the shorter pivotal bearing is situated—the longer pivotal bearing at the opposite end of the cross head, as well as the yoke associated with that bearing, being omitted in order not to obscure the parts.

Fig. 12 is a vertical section through the cross head on line 12—12 Fig. 9.

Figs. 13 and 14 are diagrammatic views illustrative of the parallel movement of the drag-bars, and of the maintained position of the cross heads and their shovel beams relatively to the thus-moving drag-bars.

Fig. 15 is a detached sectional view of one of the ball and socket connections between the drag-bars and the cross beam from which they are suspended.

A is the arch-beam; B are the wheel standards secured to said arch-beam; D are the pivot-axle standards having stub-axles C clamped to their lower ends, each standard D being pivotally connected to its wheel standard B so that it may swing thereon on a vertical axis. Each pivot-axle standard D has a steering lever $D'$ terminating in the usual stirrup $D^2$. To connect the axle standards D so that they shall swing in unison, each of them has an arm $D^3$, to which is attached a connecting-rod $D^4$, the two rods extending toward each other and being clamped in a central holder $D^5$. The pivot axle standards D are formed each with laterally projecting brackets $d$ which overhang the wheel hub or rather that portion of the stub-axle C on which the wheel is mounted, and each of which brackets carries one member of the pivot joint by which each axle standard is connected to its wheel standard B. In the general combination and arrangement of parts thus far described there is nothing new, the same being the subject of Hench's patent for pivot-axle cultivator No. 684,571 dated October 15, 1901, owned by the same Hench & Dromgold Company which is the assignee of my present invention.

Under my improvement, each wheel standard B is an elbow standard—a malleable hollow casting formed with a shelf $b'$ at its lower end, and with a shelf $b$ at its elbow, that portion of the casting below the elbow, and between the two shelves $b$ and $b'$, being open on its inner face to form a housing for the members of the vertical pivot joint between the two standards B and D, and that portion of the casting above the shelf $b$ at the elbow or bend being open on its outer face, in order to allow access to be conveniently had to the adjusting means hereinafter described on top of the shelf $b$.

In the lower shelf $b'$ is formed a socket $b^2$ for the reception of a cone pivot $d'$ on the lower laterally projecting bracket $d$ on the axle standard D. There is no cone pivot, however, upon the upper laterally projecting bracket $d$. On the contrary, there is formed in this upper bracket $d$ a socket $d^4$ for the upper cone pivot $b^3$, which is carried by and vertically adjustable in the wheel standard B. It is this combination and arrangement of parts which characterizes this portion of my improvements, the mounting of the upper cone pivot in the wheel standard, and its capacity for independent vertical movement relatively to said wheel standard, permitting of instant and effective tightening of the pivot joint and taking up of all lost motion. Various means may be employed to provide for the vertical adjustablity of said upper pivot $b^3$. I prefer, however, for this purpose the arrangement shown in the drawing, the cone pivot $b^3$, which is fitted from below up into its socket $d^4$ being secured at its top to a stout screw-threaded spindle $b^4$, which extends up through and engages a screw-threaded hole $b^5$ tapped for its reception in the upper shelf $b$. The end of the spindle above the shelf $b$ is squared at some suitable point to permit it to be conveniently engaged by some suitable operating handle or lever. By thus operating the screw-spindle $b^4$, the cone pivot $b^3$ attached to it can be drawn upwardly to close tightly, not only the joint between it and its own socket $d^4$, but also, through the intermediary of the standard D, on which it exerts an upward pull, the lower joint between the cone pivot $d'$ and the socket $b^2$, in this simple and effective way taking up all lost motion between the parts of the pivot joint between the standards B and D. A lock nut $b^6$ can conveniently be employed to hold the screw spindle $b^4$ in its adjusted position. Sufficient space should be left between the top bracket $d$ of the axle standard and the upper shelf $b$ of the wheel standard, to permit the necessary range of adjusting movement to the screw spindle.

F is the tongue secured to the arch beam A; E is the seat having its supporting arms $E'$ hinged in the usual way to the tongue. G is a cross beam forming part of the machine frame; it is rigidly secured at its middle to the tongue and connected by suitable brace and stay-rods with the other portions of the frame, as indicated in Fig. 1. It is to this cross beam that the front ends of the drag-bars are secured.

There are two shovel gangs, each consisting of two drag-bars H, H', attached at their front ends to the cross beam G by ball and socket joints g, one of which is shown in detail in Fig. 15, and in horizontal section in Fig. 1, at the point the cross beam G is broken away near one of its ends; a cross head I to which the rear ends of the drag-bars are pivotally connected by vertical pivot bolts i; and two sets of shovels, mounted each set on its own beam J, the two beams being rigidly fastened to opposite ends of the cross head I, and extending fore and aft of the machine in a line coincident with the line of draft, as shown in Fig. 1, and also in the diagrammatic Figs. 13, 14.

The drag-bars are of equal length, and parallel with one another; the pivots g are at the same distance apart from one another as are the pivots i; and a line drawn between the two pivots i at one end will be parallel with a like line drawn between the two pivots g at the other end. Thus, as shown in the diagrams Figs. 13 and 14, the two drag-bars form the longer sides of a parallelogram, whose shorter sides are the cross head I (between pivots i) and the cross beam G (between pivots g); and consequently whatever be the lateral inclination of the drag-bars on their front ball and socket pivots which unite them to the main frame, the cross head I will always maintain its parallelism with the cross beam G, and therefore the shovel beams rigidly attached to that cross head will always preserve the same fore and aft position relatively to the line of draft, as clearly indicated in the diagrammatic figures above referred to.

The structural details of the cross head I and its connections are shown in Figs. 9–12. As there indicated, the cross head is a casting having two vertically elongated bearing blocks I', I², each of them vertically pierced for the passage of the pivot bolts i by which the rear ends of the drag-bars H, H', are connected to the cross head. The drag-bar H is connected to the longer and more massive one I' of the two bearing blocks through the intermediary of a yoke J' to which it is rigidly bolted at h (Figs. 9, 10) said yoke having at its extremities cone caps j which fit cone stub bearings i' at the extremities of the bearing block I', around the hole through which the pivot bolt i passes, the parts being drawn and held together by said bolt, as indicated in Figs. 10 and 12. The drag-bar H' is connected to the shorter bearing block I² through the intermediary of a malleable grooved bearing plate K in which it fits and to which it is bolted, said plate K having a cone cap k to fit a cone stub bearing i² on the lower extremity of the bearing block I² around the hole through which the pivot bolt i pertaining to the same passes, the parts being drawn and held together by said pivot bolt, as indicated in Figs. 11 and 12. The two shovel beams J of the gang are fitted into longitudinal ways formed in the exterior opposite cheeks of the cross head I and are there rigidly secured in place by bolts or other suitable means, as more clearly indicated in Figs. 9–12.

To a central portion i³ of the cross head between the two bearing blocks I', I², is loosely connected the usual spring-pressure latch lever H² by which the gang can be lifted and lowered as desired. H³ (Fig. 1) is the stationary segmental rack in connection with which said lever operates. These devices are well known and require no further description.

Manifestly various means may be employed for the purpose of laterally swinging the two thus-mounted gangs toward and away from each other so as to place them at any desired distance apart. The means I prefer for this purpose are illustrated in Figs. 1, 2, 5–8 of the drawings.

A single operating latch lever K' is employed, in connection with a segmental rack, which latter is rigidly secured to the main frame at the intersection of the tongue F and cross beam G, as indicated in Figs. 1 and 2. At this point there is applied to the under side of the tongue a bracket-bearing L with depending sides l to receive the cross-bolt l', on which, as a pivot, is hung by its ears m the malleable casting M (Fig. 6). The bracket L is secured in place by a bolt l² which, as seen in Figs. 5, 6, and 8, passes through the bracket, the tongue F and the cross beam G, the two metal bars of which the latter is composed embracing the tongue at this point, said parts thus being held tightly and firmly together. The casting M is in effect a hanger capable of fore and aft rocking motion on the bolt l' as an axis; in a suitable seat on one side of this hanger M is fitted and secured the lower end of the operating lever K', as seen in Figs. 5 and 6, the arrangement being such that a forward swing of the lever will result in a rearward swing of the hanger, and vice versa. The free or lower end of the hanger terminates in a hollow ball N (Figs. 5–8) which is designed to form the ball member of a double ball and socket joint.

Bolted or otherwise rigidly secured to the interior opposite drag-bars H of the two gangs, and preferably thus secured to the shanks of the yokes J' which connect those drag-bars to the cross head I, as shown in Fig. 9, are connecting bars O which extend thence diagonally and convergently until they reach the ball N. Each connecting bar at this end of it has a cup or approximately hemishperical socket o, which conveniently may be formed in a small casting provided also with a seat o' into which the end of the connecting bar O can be fitted and bolted. The cups or half sockets fit upon the ball N from opposite sides, without interfering with one another. Each of them is held in engagement with the ball independently of the other, so that the swivel movement of each, and its travel over the surface of the ball, may take place without reference to the other, as indicated in Fig. 7, where the parts are shown in full lines in the position they assume when the shovel gangs are drawn together, and in dotted lines in the position they assume when the shovel gangs are spread apart. To this end each cup is held to the ball by an eyebolt p which is hung on a bolt r passing axially and vertically through the ball, both eyebolts being hung on this bolt as an axis common to both, but each eyebolt projecting (at right angles to the main bolt r) out through its own side of the ball, through a slot s therein of sufficient dimensions to allow all needed traversing movement of the eyebolt, the screw threaded outer end of the eyebolt passing through and projecting beyond the center of its cup or half socket o, the cup being held with required closeness up against the ball by a pressure nut t and lock nut t'.

Under this arrangement it will be noted that while both gangs of shovels will be operated simultaneously and together, to move toward or away from each other as the case may be, yet the connecting bars of the two gangs have each an independent connection with the operating lever of ball and socket type, each connecting bar O having a socket connection independent of the other, with a ball common to both—that ball being mounted on a pivoted hanger having a fore and aft rocking movement controlled by the operating lever, whereby the shovel gangs may be spread farther apart or brought nearer together as desired, this movement being always in parallel planes without distortion of the cross bars which carry the shovel gangs.

Having described my improvements and the best way now known to me of carrying the same into practical effect, I state in conclusion that I do not limit myself strictly to the structural details hereinbefore shown and described in illustration of my said improvements, since manifestly the same can be varied considerably without departure from the spirit of my invention: But what I claim herein as new and desire to secure by Letters Patent is as follows:

1. In a cultivator of the character described, the combination of a wheel standard; a pivot-axle standard; a vertical cone pivot on the lower portion of said pivot-axle standard; a cone socket in the lower end of the wheel standard which fits from above down upon the cone pivot on the pivot-axle standard; a cone socket in the upper end of the pivot-axle standard, in vertical axial alinement with the cone pivot in the lower end of said standard; a cone pivot which fits up from below into the last mentioned cone socket; and supporting means for said cone pivot secured to and vertically adjustable in a portion of the wheel standard above and overhanging the said cone socket, substantially as and for the purposes hereinbefore set forth.

2. In a cultivator of the character described, the combination of a pivot-axle standard having a lower bracket provided with a cone pivot and an upper bracket provided with a cone socket in vertical axial alinement with the cone pivot below, with a wheel standard having a cone socket to receive and fit down upon the cone pivot at the lower end of the pivot-axle standard, and a cone pivot to enter from below and fit up into the cone socket at the upper end of the pivot-axle standard, the wheel standard being formed with a shelf above and overhanging the cone socket at the upper end of the pivot-axle standard, and the cone pivot being carried by a screw threaded spindle which passes up through and engages a screw threaded hole in said shelf and is vertically adjustable therein to draw the members of the pivot joint together and take up lost motion between the parts, substantially as and for the purposes hereinbefore set forth.

3. In a cultivator of the character described, a wheel standard consisting of a hollow casting having an internal lower shelf in which is formed a cone socket, an internal upper shelf, and a screw threaded spindle passing through and engaging a screw threaded hole in said upper shelf, and having on its lower end below said shelf a cone pivot which is in vertical alinement with the cone socket in the lower shelf, and means for locking said spindle in its adjusted position, said hollow casting being longitudinally open on its outer face above the upper shelf, and on its inner face below the upper shelf, in combination with a pivot-axle standard carrying a stub-axle and having two laterally projecting brackets, the lower bracket formed with a cone pivot to engage the cone socket in the lower shelf of the wheel standard, the upper bracket formed with a cone socket to engage the cone pivot on the lower end of the screw threaded spindle adjustably supported in and extending below the upper shelf in the wheel standard, substantially as and for the purposes hereinbefore set forth.

4. The combination with the main frame, of a pair of parallel drag-bars, having each a ball and socket connection between its front end and the main frame; a cross head to which the rear end of each drag bar is connected by a vertical pivot, the distance between the pivotal connections of the rear ends of the drag-bars with the cross head being the same as the distance between the ball and socket pivotal connections of the front ends of the drag-bars with the main frame, and the drag-bars being of the same length between pivots; and shovel beams attached to and carried by the cross head, substantially as and for the purposes hereinbefore set forth.

5. The combination with the main frame of two shovel gangs, each consisting of a pair of parallel drag-bars of equal length between pivots, having each a ball and socket connection between its front end and the main frame, and a vertical pivotal connection between its rear end and a cross head, the distance between the pivotal connections of the two drag-bars of the pair with the cross head being the same as their ball and socket pivotal connections with the main frame; shovel beams attached to and carried by said cross head; a single operating lever; and connections between each pair of drag-bars and said operating lever, substantially as and for the purposes hereinbefore set forth.

6. The combination with the main frame and the two shovel gangs capable of lateral movement in parallel planes toward and away from one another, of a horizontally pivoted hanger capable of fore and aft rocking movement, and provided on its free end with a hollow ball member of a ball and socket joint; an operating lever for said hanger; a vertical axial bolt extending through said hollow ball; eyebolts hung on said vertical bolt as an axis and extending thence outwardly in opposite directions through slots formed for their passage in said ball; cups or half sockets fitted on opposite sides of said ball and held in place thereon by said eyebolts, on which said cups or half sockets are swiveled; and connecting bars, one for each cup or half socket, rigidly fastened to their respective cups or half sockets and extending thence diagonally to the drag-bar portion of their respective shovel gangs, to which they are secured, substantially as and for the purposes hereinbefore set forth.

In testimony whereof I affix my signature.

WILLIAM W. BIRNSTOCK.